(12) United States Patent
Schmitt et al.

(10) Patent No.: US 9,371,200 B2
(45) Date of Patent: Jun. 21, 2016

(54) DEVICE THE CONVEYING AND HANDLING OF PRODUCTS

(76) Inventors: Georg Schmitt, Kirchheim (DE); Enrico Pes, Dannenfels (DE)

( * ) Notice: Subject to any disclaimer, the term of this patent is extended or adjusted under 35 U.S.C. 154(b) by 144 days.

(21) Appl. No.: 14/355,054

(22) PCT Filed: Nov. 2, 2011

(86) PCT No.: PCT/EP2011/069244
§ 371 (c)(1),
(2), (4) Date: Jul. 22, 2014

(87) PCT Pub. No.: WO2013/064180
PCT Pub. Date: May 10, 2013

(65) Prior Publication Data
US 2015/0132098 A1    May 14, 2015

(51) Int. Cl.
  *B65G 57/06*   (2006.01)
  *B65G 57/24*   (2006.01)
  *B65G 61/00*   (2006.01)
  *B65G 47/90*   (2006.01)
  *B65G 57/03*   (2006.01)

(52) U.S. Cl.
  CPC ............... *B65G 61/00* (2013.01); *B65G 47/90* (2013.01); *B65G 57/03* (2013.01); *B65G 57/06* (2013.01)

(58) Field of Classification Search
  CPC ...... B65G 57/06; B65G 57/24; B65G 57/035; B65G 61/00; B65G 47/90; B65G 2201/0244; B65G 47/66; B65G 57/005; B65G 59/04; B65G 57/22; B65G 59/02; B65H 29/38
  USPC ................ 198/468.2, 468.8, 811; 414/791.4, 414/791.6, 792.6, 795.8, 796.9, 799
  See application file for complete search history.

(56) References Cited

U.S. PATENT DOCUMENTS 5,169,284 A * 12/1992 Berger ................ B65G 47/907
                                                      294/87.1
5,564,893 A   10/1996 Tacchi et al.
(Continued)

FOREIGN PATENT DOCUMENTS

DE    4206038    9/1993
DE    4314832    12/1994
(Continued)

OTHER PUBLICATIONS

International Search Report for PCT/EP2011/069244 dated May 10, 2013.

*Primary Examiner* — Gregory Adams

(57) ABSTRACT

The invention relates to a method for the handling of products in a product-handling installation, comprising the following method steps:
  a) providing at least one product on a flexible placing area,
  b) placing a cage, which is equipped with at least one displaceable supporting-body group, onto the flexible placing area,
  c) imparting at least one deflection to the flexible placing area and displacing the deflection along the flexible placing area, and
  d) simultaneously retracting the at least one supporting-body group into a gap created by the at least one deflection between the flexible placing area and a lower side of the products.
The invention further relates to a method for the palletizing of products. Furthermore, a device for the handling of products and the use of said device for the palletizing of products is proposed.

18 Claims, 5 Drawing Sheets

(56) References Cited

U.S. PATENT DOCUMENTS

| | | | |
|---|---|---|---|
| 5,896,978 A | 4/1999 | Spatafora | |
| 6,332,750 B1 * | 12/2001 | Donner | B65G 59/023 414/796.9 |
| 6,555,418 B2 * | 4/2003 | Kurosawa | H01L 21/67144 156/350 |
| 6,916,686 B2 * | 7/2005 | Wada | H01L 23/3128 257/E23.13 |
| 7,243,481 B2 | 7/2007 | Draghetti | |
| 7,500,819 B2 * | 3/2009 | Nielsen | B65G 57/035 198/468.8 |
| 2005/0260829 A1 * | 11/2005 | Uematsu | H01L 21/3043 438/460 |
| 2008/0088143 A1 * | 4/2008 | Michels | B65G 47/66 294/68.2 |
| 2008/0095604 A1 | 4/2008 | Jeon | |
| 2011/0286825 A1 * | 11/2011 | Michels | B65G 47/66 414/564 |

FOREIGN PATENT DOCUMENTS

| | | |
|---|---|---|
| DE | 19963021 | 6/2001 |
| DE | 10111680 | 9/2002 |
| EP | 1437314 A1 | 7/2004 |
| EP | 1223126 | 6/2006 |

* cited by examiner

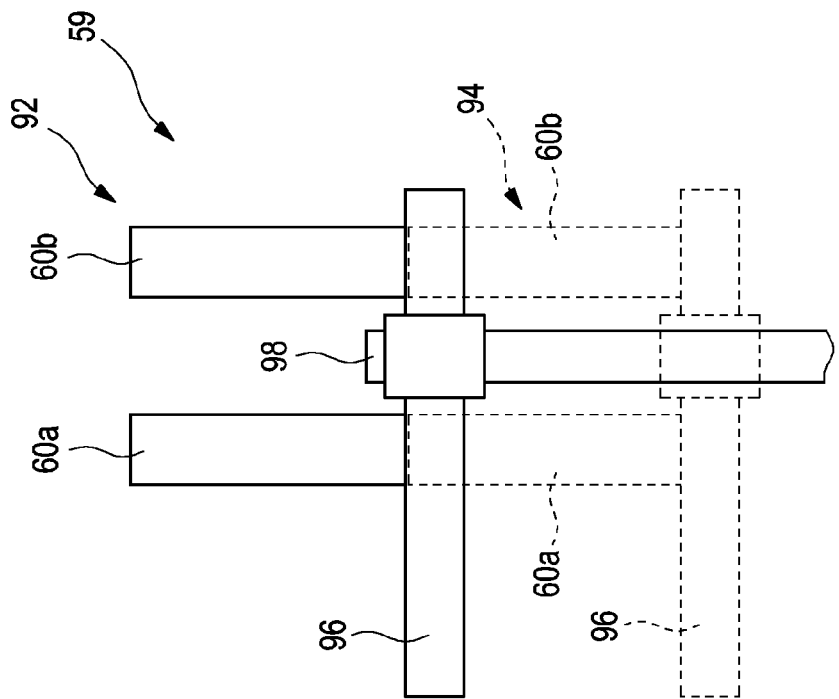
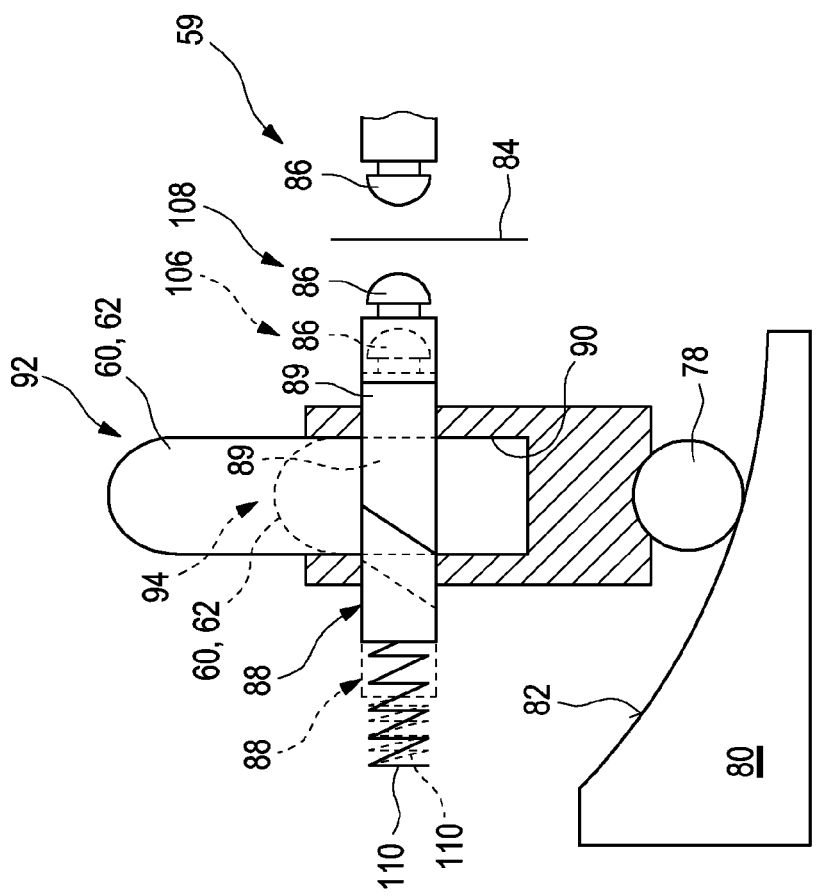

# DEVICE THE CONVEYING AND HANDLING OF PRODUCTS

PRIORITY CLAIM

This application is a national stage application of PCT/EP2011/069244, filed Nov. 2, 2011, the entire contents and disclosures of which are hereby incorporated by reference.

THE PRIOR ART

The invention relates to a method for the handling of products in a product-handling installation and to a method for the palletizing of product layers. Furthermore, the invention relates to a device for the handling of products in a product-handling installation, and the use of the device for the palletizing of product layers.

A method and a device for the packaging of products is disclosed in WO 2004 014 730 A1. According to this solution, the packaging of products takes place by means of a suction gripper which suctions the product to be processed. The suction gripper comprises a number of suction-gripping heads which are arranged in the horizontal and at least one suction-gripping head which is arranged in the vertical. Said suction-gripping heads are accommodated on a gripper arm which is movable both laterally and also in the vertical direction, in particular in the Z-direction. In the case of this solution, for reliable gripping and subsequent packaging of an article or product, the application of negative pressure, which has to be delivered to the suction-gripping heads which may be arranged on the lower side of a gripper arm, necessary.

EP 0 629 573 B1 relates to an infeeding device for the pick-up and infeeding of articles. In the case of this solution, the pick-up of articles also takes place by means of suction-gripping heads which are arranged at the lower end of a gripper arm which is movable in the Z-direction. Besides, the gripper arm is movable in an X/Y-plane and, as can be seen in the drawings of EP 0629 573 B1. may be displaced in an X/Y-operating plane. According also to this solution, the gripping of articles takes place by way of suction-gripping heads which are impinged by a negative-pressure source and which are accommodated on the lower side of the gripper arm which is movable up and down the Z-direction and displaceable within the X/Y-operating plane.

DE 101 11 680 A1 discloses a device for the palletizing of approximately cuboid-shaped piece goods to form a piece-goods stack. The device comprises a piece-goods infeed, having guide means for orienting and/or turning piece goods from at least one device for assembling piece-goods rows, having a conveying track and a stop for the piece goods. The device furthermore comprises at least one pushing device for the lateral displacing of piece-goods rows onto a layer-supporting means which is adjacent to the conveying track, wherein the piece-goods layer assembled on the layer-supporting means can be moved onto the piece-goods stack.

DE 43 14 832 C1 discloses a stacking device for sheet-shaped goods. The device serves for stacking metal sheets by means of a transport device, on the transport surface of which the sheets lie in an arrangement behind one another and spaced apart from one another and are deposited at a stack-depositing place. The transport device has an oscillating diverter for apportioning the sheets, wherein, downstream of the diverter, feeding of the sheets takes place to at least two stack-depositing places having infeed units. The transporting speed is reduced in comparison to the transporting speed of sheets of an infeeding device which is associated with the transport device and upstream of the diverter.

The subject matter of DE 199 63 021 A1 is a discharge conveyor for picking up and transporting away stackable piece goods. The discharge conveyor comprises a, in particular, multi-part revolving discharge-conveyor belt which is downstream of a device for the automatic order-picking of stackable piece goods. Provided are a first conveyor, and a conveyor which is spaced apart, and a third conveyor which is arranged in between and which, by means of an actuating drive, can be actuated so as to be outside the conveying path of the first and of the second conveyor. The third conveyor serves as a sorting conveyor, in particular as a sorting conveying path for stacking sorted stackable piece goods in an assigned magazine. The sorting conveyor serves as an ejector of sorted piece goods, in particular in an actuated deflection position which is directed downward by pivot action.

DE 602 12 212 T2 discloses a method and a device for forming orderly groups of paper rolls. According to this solution, this is a palletizing device, wherein a method for forming orderly groups of rolls of paper is proposed. Each group of a first number of layers lying above one another comprises rolls. Each layer furthermore comprises a second layer of rows lying beside one another, which rows are formed in each case by a third number of rolls, which number is the same for all rows. The method comprises the steps of predefining a first, second and third number from respective ranges and conveying the rolls in a first direction to a loading station, in order to successively form rows of rolls at the loading station. Said rolls touch one another in the first direction, wherein each row is formed by the predefined third number of rolls. Also disclosed is the unloading of the rows, one after another, from the loading station in a second direction, which is transverse to the first direction, in order to form a succession of rows which lie beside one another on a carrier, wherein each row comprises the predefined third number of rolls. According to this solution, unloading of successive parts of the succession of rows one after another from the carrier in the first direction is proposed, wherein each part is formed by the predefined second number of rows in such a way as to create a succession of layers which in each case comprises the predefined second number of rows lying beside one another. The method proposed according to this solution furthermore comprises the conveying of successive parts of the succession of layers in the first direction to the stacking means, wherein, in order to form a succession of groups, each part is configured by the predefined first number of layers.

The disadvantages of the solutions known from the prior art are to be seen, in particular, in that they require a comparatively large footprint, which is very expensive. Placing areas, in which the products being discussed are arranged according to different placing patterns, are usually configured in the size of a europallet. A europallet has the dimensions of 800 mm by 1200 mm. In the case of the conventional solutions according to the prior art, prongs or rake-like shapes are laterally inserted between the placing area and the product, wherein the geometric configuration of the rake-like shapes has precisely the size of a pallet, such that, in the case of the unretracted state of the rake-like shapes, precisely the pallet surface is, therefore, once again doubled, which leads to the described set of problems with space.

Further disadvantages of the solutions known from the prior art arise with respect to the stable handling of products which are arranged in various placing patterns. In this manner, the products which are arranged in placing patterns may be put on a roller track and raised from below, between the rollers, by way of prongs or rake-like shapes. Also, in the case of these solutions according to the prior art, after raising, prongs or rake-like shapes are usually laterally inserted, and the products which are arranged in the placing pattern are conveyed onto a pallet. Methods of this type, however, have the disadvantage that the product has to be initially raised before the products can be put onto the actual device for conveying the products. Additionally, on account of the only partial support of the products which are in the placing pattern, stability can be influenced in a disadvantageous manner.

Further disadvantages with respect to the products to be handled also result from the solutions known from the prior art. Accordingly, in particular, products or their packaging which are easily damaged have to be picked up and maneuvered in a correspondingly careful manner. In the course of using rake-like shapes for picking up products or gripping products from below, damage may easily occur on account of endemic stress. In the case of products being gripped with suction arms, packaging which is easily damaged can be additionally problematic. For example, a vacuum cannot be created by suction in the case of products packed in plastic film having minor damage, and the product cannot be gripped using a suction arm, which may lead to interruptions in the operation of the installation.

SUMMARY OF THE INVENTION

The present invention is based on the object of providing a method and a device for the handling of products, requiring a minimal footprint, with which the products can be securely gripped from below and can be stacked in layers in a stack shape, in particular on a supporting body which is configured to be pallet-like.

The invention is furthermore based on the object of always reliably gripping a group of products which are arranged in a variable placing pattern, wherein secure gripping is ensured in the first gripping attempt.

According to the invention, a method for the handling of products in a product-handling installation, comprising the following method steps, is proposed:

Initially, providing at least one product on a flexible placing area takes place.

Subsequently, placing a cage, which is equipped with at least one displaceable supporting-body group, onto the flexible placing area takes place.

This is followed by imparting at least one deflection to the flexible placing area and by displacing the deflection along the flexible placing area.

In the course of imparting the at least one deflection to the flexibly configured placing area, a simultaneous retraction takes place of the at least one supporting-body group into a gap created by the at least one deflection between the flexible placing area and a lower side of the products.

Product-handling installations of the abovementioned type typically comprise one or more stations of a production line in which staple products, such as printer paper, sanitary paper, beverages or the like, in packaged and/or unpackaged form, are handled. Examples of stations of this type are placing units in which individual products are arranged in a placing pattern to form a product group, or palletizing units which stack products or product groups on a loading unit, such as a pallet or a container. In order to transport the products or the product groups between individual stations of the production line, conveyor belts, which may be designed, for example, as a plastic belt, a textile-fabric belt, a chain belt or a roller belt, are usually employed. The products are typically palletized at the end of a production line, in that a product layer is formed on the placing area in the placing unit and the formed product layers are stacked one after another in layers by the palletizing unit on the loading unit.

The solution proposed according to the invention makes it possible for products or product groups of any weight to be reliably gripped from below and for their secure handling in the course of conveying the products to be ensured.

For gripping from below in the method according to the invention, the cage is initially placed onto a flexible placing area. The flexible placing area may be designed as a conveyor belt, for example as a plastic belt, a plastic modular belt or a roller belt. In the course of being placed onto the flexible placing area, the cage may be lowered by a robot, such as a gantry robot or an industrial robot, from a position above the products onto said products. In the lowered state, the cage may at least partially laterally enclose the products on the placing area, which may be arranged, in particular in a placing pattern, to form a product group. To this end, fixed securing elements may be designed to enclose products which are arranged in a predefined shape and size. Alternatively, the securing elements may be devised movably to enclose products which are arranged in any shape and size.

The cage is furthermore equipped with at least one displaceable supporting-body group which may be arranged on one side or on sides of the cage which are opposite one another. In one embodiment of the method according to the invention, the supporting-body groups in the cage are held in a vertical rest position. Once the cage has been lowered over the products, the supporting-body groups are propelled from a substantially vertical position into a substantially horizontal position under the products. In this context, substantially vertical comprises deviations of less than 30°. preferably less than 15°. and particularly preferably less than 5° from the vertical (Z-direction). Furthermore, substantially horizontal comprises deviations of less than 30°. preferably less than 15°. and particularly preferably less than 5° from the horizontal (X-direction).

The supporting-body groups are preferably designed to be flexible. This enables, for example, guiding the supporting-body groups by way of drive rollers, which facilitates a space-saving construction of the cage. The supporting-body groups may be designed in particular as mats which comprise rods, made of e.g. carbon, metal and/or plastic, which are flexibly interconnected. In order to implement deployment and retraction of the mats, said mats, on the ends of the rods, may be incorporated into a guide and be transferred via drive rollers from the substantially vertical position to the substantially horizontal position (and vice-versa). The length of the rods here depends mainly on the surface which is occupied by the products which are to be picked up by gripping from below. Depending on the weight of the products and, therefore, the load which has to be absorbed by the supporting-body groups, for example, the material or the diameter of the rods can be adapted accordingly.

When transferring into the substantially horizontal position, retracting the support-body groups takes place simultaneously with the imparting of the deflections to the flexibly configured placing area. In this context, simultaneously means that the supporting-body groups and the displacing deflection of the placing area move in a substantially synchronous and thus a time-coordinated manner. This is to say that the supporting-body group chases the continuing deflection in the gap created between the flexible placing area and the lower side of the products. Therefore, the supporting-body groups in the cage can follow the displacement of the deflection in the flexible placing area and can be propelled below the products.

In a further embodiment of the method according to the invention, the deflections in the flexible placing area are generated at ends of a product longitudinal side that lie opposite one another. In this embodiment, respective supporting-body groups which can follow the displacement of the deflections in the flexible placing area are provided at ends of the cage that lie opposite one another. Alternatively, the deflections in the flexible placing area may be generated at one end of the product longitudinal side, wherein the deflections may be displaced along the full product length. Accordingly in this embodiment, one supporting-body group which follows the displacement of the deflection may be provided on one side of the cage.

Various mechanisms may be employed for the generation of the deflection. In the case of a roller belt being used as a placing area, pneumatic, hydraulic and/or electromotive mechanisms may be used to deflect individual rollers in one continuous movement. For example, springs which, by way of a corresponding activation, cause the deflection of the conveyor belt and the displacement of the deflection, may be arranged below the rollers.

Alternatively, deflection elements, which are arranged below the flexible placing area and which generate and displace deflections in the placing area, may be employed. Preferably, the deflections generated at the ends of the product longitudinal side of the flexible placing area are displaced by moving the deflection elements toward one another. In particular, the deflections which are generated in the flexible placing area are displaced so as to simultaneously move toward one another. In order to grip from below, in this embodiment supporting-body groups are provided in the cage at ends of the product longitudinal side that lie opposite one another, so that said support-body groups can be simultaneously retracted with the generated deflections.

The deflections which are displaceable in the flexible placing area may be generated by mechanically actuatable deflection elements which are preferably arranged below the placing area and, in particular, below the conveyor belt. The shape of the deflection elements may be chosen here such that, in order to avoid damage, no sharp edges, such as corners, act on the flexible placing area while the deflection is being imparted. Therefore, the deflection elements are preferably rounded in those regions in which said deflection elements may directly act on the flexible placing area. In order for the deflection elements to be able to generate a deflection of the flexible placing area and to enable the supporting-body group to be simultaneously propelled below the products, a plurality of deflection elements may be preferably at least partially arranged along a product longitudinal side. Alternatively, one deflection element per supporting-body group may be provided under the placing area, the extent of which deflection element extends at least in parts along a product longitudinal side. The deflection elements, which impart deflections to the flexible placing area, may furthermore be electromotively, pneumatically or hydraulically driven.

In one implementation of the method according to the invention, the deflection elements are displaced along a closed, curved displacement path. To this end, the closed, curved displacement path comprises a lifting portion, in which the deflection element is raised, a displacement portion, in which the deflection element is situated in a raised position, a lowering portion, in which the deflection element is lowered, and a return-motion step, in which the deflection element is guided back. The deflection elements are raised in the lifting portion, in particular by way of a gate assigned to said lifting portion.

The afore-described method is used according to the invention in a method for the palletizing of products. To this end, the following method steps may be repeatedly executed:

Initially, a product layer having one product or a plurality of products, arranged in a placing pattern, is provided. This typically takes place in a placing unit in which the products are arranged by way of grippers or slides.

Subsequently, the product layer is picked up according to the afore-described method in a cage. This may take place immediately after the provision of the products, for example in the placing unit or on a downstream picking place.

The product layer which has been picked up is then transported with a robot, which is connected to the cage, to the position of the loading unit, for example the pallet. As a robot, for example a linear robot, having up to 3 linear axes and, if applicable, up to 3 rotation axes, or an articulated-arm robot having up to 6 rotation axes, may be employed.

Having arrived at the position of the pallet, the supporting-body groups can be propelled via rollers in the opposite direction and be transferred from the pick-up position to the rest position. This allows the product layer which is being transported to be placed down on the loading unit.

Subsequently, the emptied cage is guided back with the robot into a position which is above the provided product layer and is thus ready again to pick up a product layer. In this manner, product layers can be stacked one after another on the loading unit.

According to the invention, a device for the handling of products in a product-handling installation is additionally proposed, which device is preferably suitable for the implementation of the afore-described method. To this end, the device comprises at least the following components:

a station which provides at least one product on a flexible placing area;

a deflection unit which is assigned to the flexible placing area and is configured to impart at least one deflection to the flexible placing area and displace said deflection along the flexible placing area;

a cage for picking up products, wherein the cage is equipped with at least one displaceable supporting-body group which, simultaneously with the displacement of the at least one deflection, can be propelled into a gap created by the at least one deflection between the flexible placing area and a lower side of the products.

In one embodiment of the device according to the invention, the flexible placing area comprises a conveyor belt which may be designed as a plastic belt, a fabric belt, a modular belt, or a roller belt. The placing area here may form part of the placing unit, or the products may be formed in the provided placing pattern in the placing unit and subsequently be transported to the picking place having a placing area.

The deflection unit may comprise deflection elements which are displaceably mounted below the placing area in a guide for a closed, curved displacement path. The guide comprises, in particular, a gate for raising the deflection element, a displacement portion for displacing the deflection element in a raised position, a lowering step for lowering the deflection element, and a return-motion step for guiding back the deflection element.

In order to impart deflections to the placing area, the deflection elements may be electromotively, pneumatically and/or hydraulically driven. The deflection elements, in particular, may be designed to be mechanically actuatable in order to generate displaceable deflections in the flexible placing area.

In a further embodiment of the device according to the invention, the supporting-body groups in the cage and the deflection elements below the placing area are arranged at the ends of the product longitudinal side and mounted so as to be displaceable toward the center of the product layer. The supporting-body groups here may be designed as a flexible mat made of metal rods having flexible connection elements.

In a further embodiment of the device according to the invention, the supporting-body groups, in the rest position, are vertically arranged and, in the pick-up position, are arranged propelled below the product.

Furthermore, according to the invention the use of the afore-described device for the handling of products in a device for the palletizing of products is proposed. In particular, the afore-described device may serve for the pick-up and/or transport of products. A device of this type for the palletizing of products may, inter alia, comprise the following components:
- a placing unit for providing a product layer having products arranged in a placing pattern;
- a pick-up unit for picking up the product layer in a cage and for placing down the product layer on a pallet according to the afore-described method;
- a robot which is connected to the pick-up unit for conveying the product layer.

ADVANTAGES OF THE INVENTION

The invention enables a secure handling of products in production lines, in particular in the case of end-of-line palletizing. By way of gripping the products from below with the supporting-body groups, it is achieved that products and, in particular, product groups in which products are arranged in a predefined placing pattern can be handled in a stable and secure manner.

The supporting-body groups, in a rest position, may furthermore be vertically arranged, such that the device according to the invention requires a minimal footprint. In particular in the case of automated installations for large-scale production, the device according to the invention leads to not inconsiderable savings in terms of space requirement.

On account of imparting at least one deflection to the flexible placing area and of the simultaneous retraction of the supporting-body groups, rapid handling is furthermore achieved, since no intermediate steps are required for raising and gripping the products from below. This results in rapid handling of the products with reduced idle time, and thus increases the performance potential of industrial production lines.

Increased system availability is complemented by a reduction in the outlay for installation, since imparting a deflection to the flexible placing area can be implemented using few components. Here, the simple construction provides a reliable and cost-effective potential for the automated handling of products. In particular, the deflection unit can be implemented using purely mechanical elements, which permits a reliable and low-maintenance execution of the deflection unit.

Situations in which products in placing patterns have to be conveyed are often encountered in large-scale production, and the invention may contribute significantly toward a cost-effective and rapid provision of products.

BRIEF DESCRIPTION OF THE DRAWINGS

The invention is described in more detail in the following by means of the drawings. In the drawings:

FIG. 5 shows a detailed illustration of a latching mechanism of the deflection elements, including a gate curve which controls the deflection elements, and FIG. 6 shows a schematic illustration of the deflection unit in a longitudinal section.

VARIANTS OF EMBODIMENTS

Figure 1:
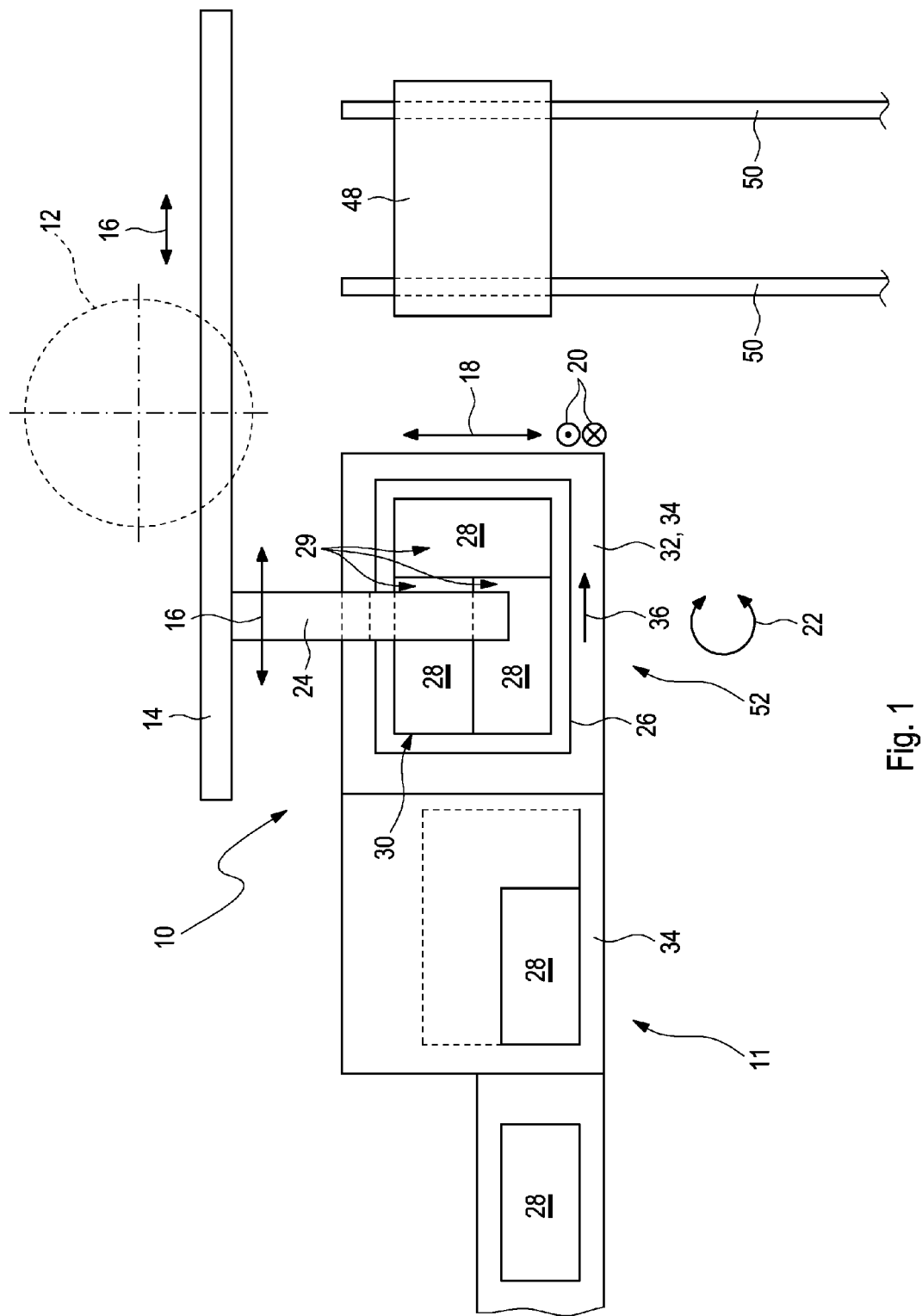
FIG. 1 shows a schematic illustration of a product-handling installation which is equipped with a device for the handling of products, according to the invention.

FIG. 1, in an exemplary manner, shows a product-handling installation 10, such as is to be found at the end of the production line of typical production installations, in particular for palletizing. Here, the products 28, which have been produced and are often already packed, are transported by a transport unit, in most cases a conveyor belt 34, to a placing unit 11, where variable placing patterns 29 are formed. The placing pattern 29 is generally defined according to the extent of the loading unit 48, such as a pallet, onto which the products 28 which are arranged in the placing pattern 29 are to be placed in layers in a stacked manner.

After formation of the placing pattern 29 in the placing unit 11, the product layer 30 is conveyed to the product-handling installation 10 according to the invention. The product-handling installation 10 comprises a robot 12, 14, which may be designed, for example, as a complex industrial robot 12 or, in simpler execution, as a gantry robot 14. In the embodiment shown in FIG. 1, a gantry robot 14 is illustrated in an exemplary manner, and the potential for an industrial robot 12 is indicated by dashed lines.

By way of a gantry robot 14, simpler control for product handling can be implemented, since, for conveying the product layers 30, the gantry robot 14 comprises an arm 24 which is mounted so as to be movable at least in the X-direction and in the Z-direction. A cage 26, which picks up the product layer 30 from the picking place 52 and transports said product layer 30 by means of the gantry robot 14 onto the pallet 48, follows on from the arm 24.

In other embodiments, the robot 12, 14 may also be an industrial robot 12 having a hinged arm or an articulated arm. Robots 12 of this type enable additional movements in a three-dimensional space 16, 18, 20, 22, on account of which a more flexible handling of the cage 26 and the product layer 30 which, if applicable, is accommodated therein, can be achieved.

The cage 26, which serves for picking up the product layer 30, follows on from the arm 24 of the gantry robot 14 or the hinged arm of the industrial robot 12. After formation of the placing pattern 29 and conveying the product layer 30 to the picking place 52, the product layer 30 is situated on a placing area 32 which is formed by a conveyor belt 34. The conveyor belt 34 may be, for example, mounted on rollers so as to be movable in the revolving direction 36. In this manner, the product layer 30 which has been formed in the placing unit 11 can be brought into a position on the picking place 52 from which the cage 26 can pick up the product layer 30.

To this end, the cage 26 is initially situated above the product layer 30. Subsequently, the arm 24 of the gantry robot 14 is displaced so far in the Z-direction 20 that the cage 26 laterally encloses the product layer 30. After pick-up of the product layer 30 in the cage 26, the gantry robot 14 moves the cage 26 in the Z-direction and the X-direction 20, 16 to a position above the loading unit 48 and is opened in order to place down the product layer onto the loading unit 48. In this manner, a plurality of product layers 30 are stacked on the loading unit 48 and subsequently conveyed via conveyor rails 50, for example into a warehouse or into a truck for onward transport.

Figure 2:
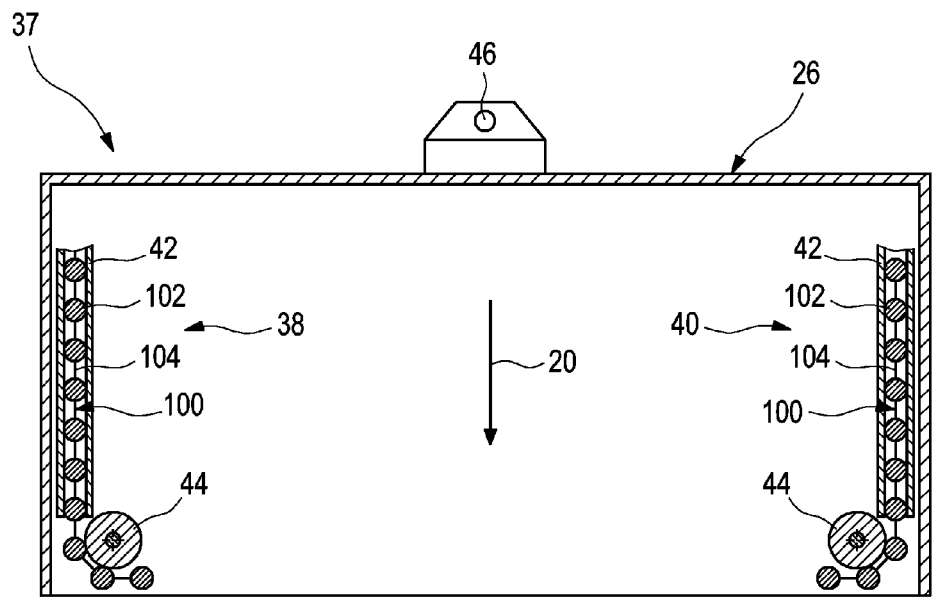
FIG. 2a shows a schematic illustration of a cage for picking up products, according to FIG. 1, having supporting-body groups in a rest position.
FIG. 2b shows a schematic illustration of the cage for picking up products, according to FIG. 2a, having supporting-body groups in a ready-to-pick-up position.
Figure 2:
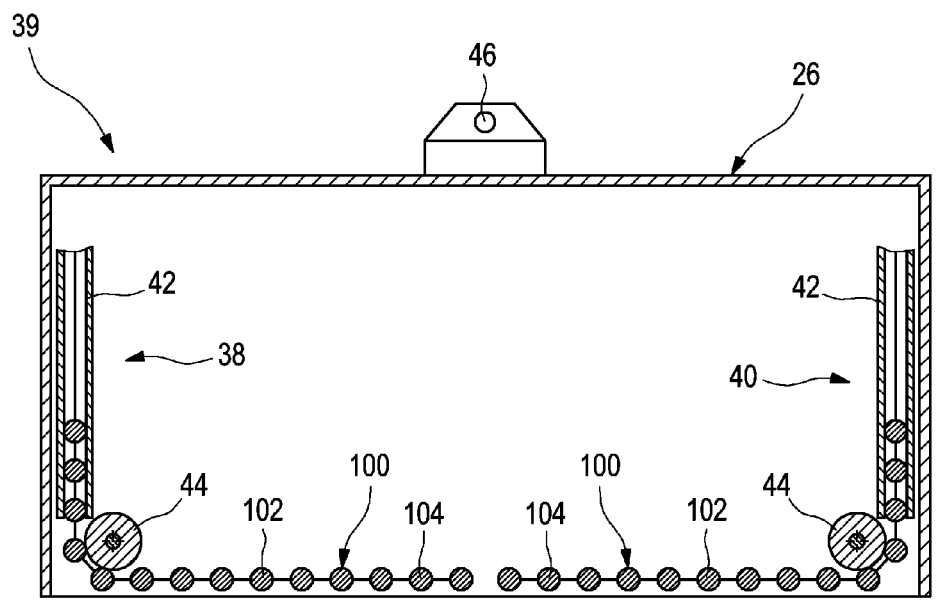

FIG. 2A shows a sectional view of the cage 26, which comprises a first and a second supporting-body group 38, 40 in a supporting-body guide 42. In the case of the illustrated cage 26, the first and the second supporting-body groups 38, 40 are retained in the supporting-body guide 42 in the rest position 37. The supporting-body groups 38, 40 are furthermore designed to be flexible and can be transferred via rollers 44 to the pick-up position 39 shown in FIG. 2B. The supporting-body guide 42, in particular, is vertically mounted along the Z-axis 20 in the cage 26. In this manner, the supporting-body groups 38, 40, in the rest position 37, require little space.

In order to pick up the product layer 30, the cage 26 having the supporting-body groups 38, 40 is positioned from above the product layer 30 in the Z-direction 20 so as to be on the picking place 52. Subsequently, a deflection unit 59, which is below the product layer 30, is actuated such that the supporting-body groups 38, 40 can be guided, via rollers 44, under the product layer 30. Thereafter, the supporting-body groups 38, 40 are situated in the position 39 shown in FIG. 2B. With the supporting-body groups 38, 40 being below the product layer 30, the robot 12, 14, which is connected to the cage 26 at the pivot-motion point 46, can displace the product layer 30 into freely selectable positions. In order to place down the product layer 30 onto the pallet 48, the rollers 44 are driven in the opposite direction. The supporting-body groups 38, 40 move along the supporting-body guide 42 into the rest position 37, and the product layer 30 is placed down onto the pallet 48.

In the embodiment shown in FIGS. 2A and 2B, the supporting-body groups 38, 40 comprise flexible mats 100. The mats 100 are produced from rods 102 which are held together, for example, by flexible connection elements 104. The rods 102 here are oriented such that guiding via the rollers 44 is possible. In particular, the length and the diameter of the rods 102, and the flexible material for connecting the rods 102, for example the extent and/or weight of the rods, can be adapted to the products 28, 30 to be transported.

Figure 3:
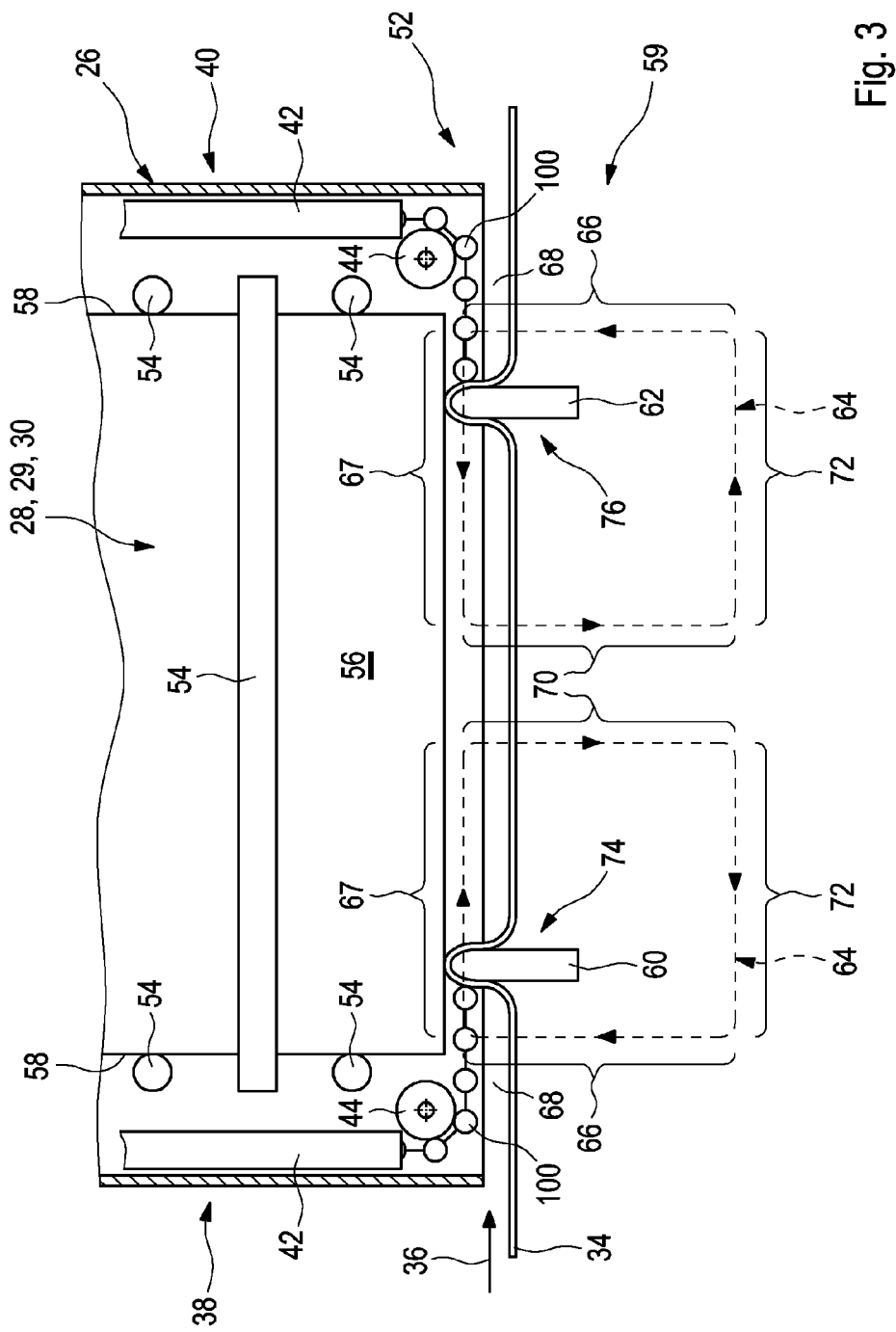
FIG. 3 shows the generation of a deflection in the flexible placing area, and deflection means which generate said deflection in the flexible placing area, and a lateral propelling of the supporting-body group into the gap created between the product and the flexible placing area.

FIG. 3 shows a lateral view onto the picking place 52 having the cage 26 which encloses the product layer 30 placed on top. In order to ensure secure picking up and to avoid any slippage of the products 28 in the product layer 30, the cage 26 furthermore comprises securing element 54 which retain the products 28 in the predefined placing pattern 29. The securing elements 54 here may be designed to be fixed for one size of the product layer 30 or to be movable for different sizes of the product layer 30. The securing elements 54 preferably are in contact with the product transverse sides 58.

For pick-up of the product layer 30 by the supporting-body groups 38, 40 in the cage 26, a deflection unit 59 is attached below the conveyor belt 34. The deflection unit 59 comprises deflection elements 60, 62 which are moved via a guide mechanism along the displacement path 64. The displacement path of the first deflection element 60 is schematically indicated by means of the dashed line 64 in FIG. 3.

In order to guide the supporting-body group 38 under the product layer 30, the deflection element 60 is raised along the raising portion 66 below the conveyor belt 34, immediately beside the product layer 30. Subsequently, the deflection element 60 is moved along the displacement portion 44 toward the center of the product layer 30. At the same time, the roller drive 44 of the supporting-body group 38 is devised such that the supporting-body group 38 chases the deflection of the conveyor belt 74. On account of the deflection of the conveyor belt 74 with the deflection element 60, a gap 68, through which the supporting-body group 38 is guided under the product layer 30, is thus created below the product layer 30.

The deflection element 62 and the supporting-body group 40, coming from the other side, are operated in the same manner. The deflection elements 60, 62 meet one another in the center of the product layer 30, causing the lowering of the deflection elements 60, 62 along the lowering portion 70. Subsequently, the deflection elements 60, 62 can be guided back along the return-motion portion 72 to their original position. Therefore, the supporting-body groups 38, 42 are guided under the product layer 30 by the deflection unit 59, and the product layer 30 can be picked up by the cage 26.

Figure 4:
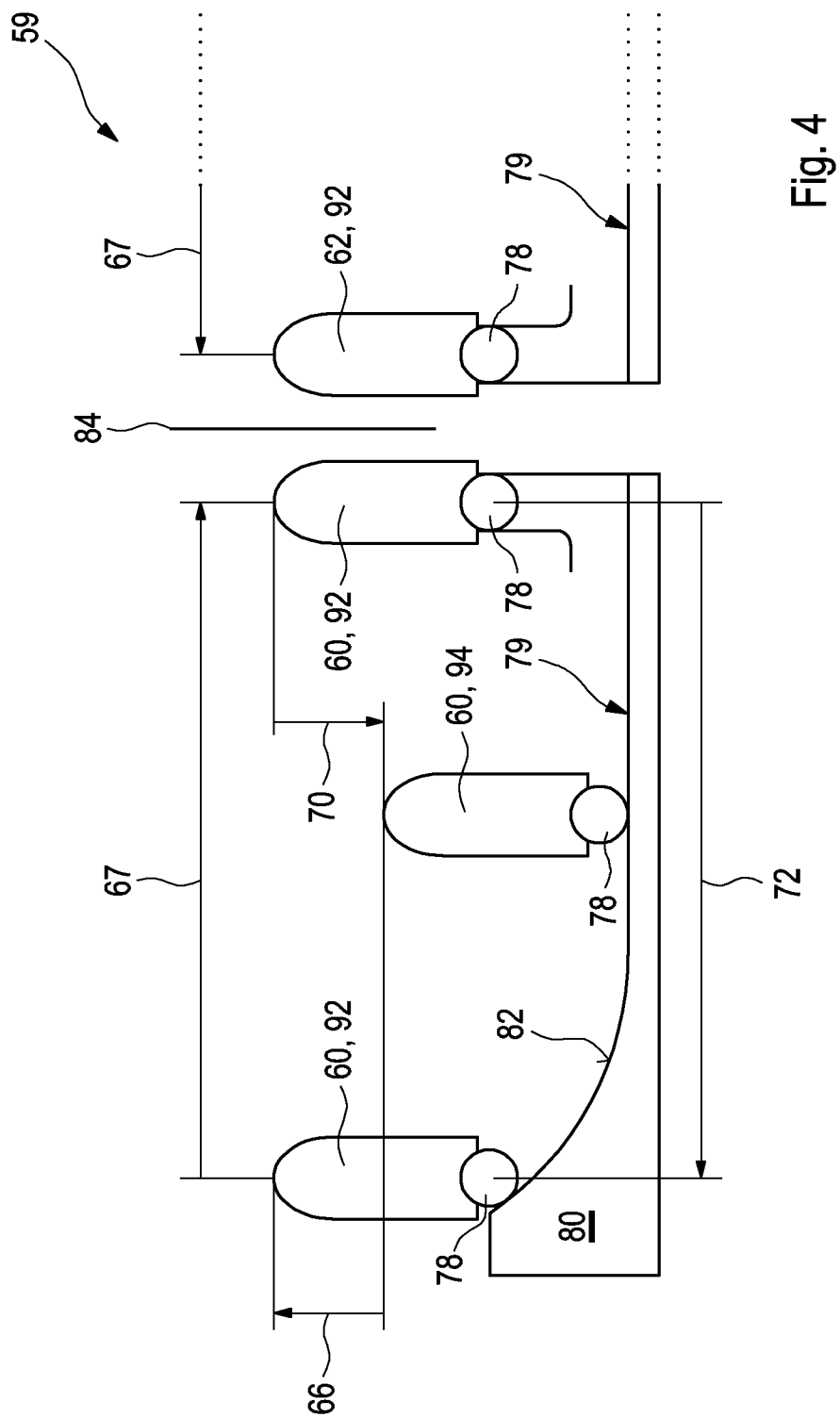
FIG. 4 shows, in a schematic manner, the positions of deflection elements which are arranged below the flexible placing area and generate displaceable deflections in the flexible placing area.

The deflection unit 59 may furthermore be implemented in a pneumatic, hydraulic or mechanical manner. A mechanical implementation of the deflection unit 59 is shown in an exemplary manner in FIGS. 4 to 6. The deflection elements 60, 62 move, for example, via rollers 78 in a guide 79, along the displacement path 64. A gate 80, having a rolling surface 82, raises the deflection elements 60, 62, such that the conveyor belt 34 is deflected. The deflection elements 60, 62 are lowered at their contact point 84 and displaced on the return-motion portion 72.

Deflection and lowering of the deflection elements 60, 62 into a raised position 92, or a lowered position 94, respectively, may be implemented, for example, by means of the device having a latching mechanism, shown in FIG. 5. To this end, a securing key 88, which has a recess 89, is provided in the guide 90. The recess 89 here enables that the deflection element 60, 62 can assume a raised position 92 and a lowered position 94. In the first position 108, the securing key 88 causes the deflection element 60, 62 to be in the raised position 92. A spring 110, which retains the securing key 88 in the first position 108, is provided here. Upon contact of the buffer 86 at the contact point 84, the spring 110 is compressed, the securing key 88 transfers into the second position 106 and the deflection element 60, 62 is lowered into the lowered position 94.

On the return-motion portion 72, the deflection elements 60, 62 are situated in the lowered position 94. When being displaced along the gate 80 having the rolling surface 82, the deflection elements 60, 62 are deflected toward the conveyor belt 34 until the securing key 88 retains the deflection elements 60, 62 in the raised position 92. Subsequently, the deflection elements 60, 62 are displaced along the displacement portion 67 to the center of the product layer 30, where the buffers 86 of the two deflection elements 60, 62 meet one another. The meeting of the buffers 86 with one another releases the securing key 88, and the deflection elements 60, 62 move along the recess 89 into the lowered position 94. Subsequently, the deflection elements 60, 62, move by means of the rollers 78, along the guide 79 in the return-motion portion 72.

A side view onto the deflection unit 59 having deflection elements 60 is illustrated in FIG. 6. The deflection elements 60a. 60b are fastened on a bar 96 which is connected to a guide tube 98. The bar 96 here extends below the placing area 32, along the X-direction or Y-direction 16, 18, in order, during displacement, to impart a deflection to the placing area 32. In the deflected position 92, the bar 96 is situated at the upper end of the guide tube 98. After the buffers 86 meet one another, the bar 96 moves downward along the guide tube 98, and the deflection elements 60a. 60b are situated in the lowered position 94.

The method according to the invention for picking up products in a cage 26 of a product-handling installation 10 enables a rapid and secure conveying of products 28, 30 between different stations 52, 48. In addition, the product-handling installation 10 having the cage 26 according to the invention requires little space, which enables an efficient and economical floor plan, in particular for large-scale production installations.

The invention is not limited to the described exemplary embodiments and the aspects highlighted therein. Rather, a multiplicity of variations which are within the scope of the knowledge of a person skilled in the art are possible on account of the range indicated by the appended claims.

LIST OF REFERENCE SIGNS

10 Product-handling installation
11 Placing unit
12 Industrial robot
14 Linear-handling unit
16 X-direction
18 Y-direction
20 Z-direction
22 Deflection movement
24 Arm
26 Cage
28 Product
29 Placing pattern
30 Product layer
32 Placing area
34 Spring belt (plastic-module belt)
36 Revolving direction
37 Rest position of the supporting-body groups
38 First supporting-body group
39 Ready-to-pick-up position of the supporting-body groups
40 Second supporting-body group
42 Supporting-body guide
44 Deflection pulley/Deflection roller
46 Pivot-motion point
48 Pallet
50 Conveying rail
52 Picking place
54 Securing elements
56 Product longitudinal side
58 Product transverse wood blocks
59 Deflection unit
60 First deflection element
62 Second deflection element
64 Displacement path
66 Lifting portion
67 Displacing portion
68 Resulting gap
70 Lowering portion
72 Return-motion portion
74 First deflection, conveyor belt
76 Second deflection, conveyor belt
78 Roller
79 Guide, deflection element
80 Gate
82 Rolling surface
84 Contact point
86 Buffer
88 Securing key
89 Recess
90 Guide
92 Raised position, deflection elements 60, 62
94 Lowered position, deflection elements 60, 62
96 Bar
98 Guide tube
100 Mat
102 Rods
104 Connection element
106 Second position
108 First, securing position
110 Spring

The invention claimed is:

1. A method for the handling of products in a product-handling installation, comprising the following method steps:
   a) providing at least one product on a flexible placing area,
   b) placing a cage, which is equipped with at least one displaceable supporting-body group, onto the flexible placing area,
   c) imparting at least one deflection to the flexible placing area and displacing the deflection along the flexible placing area, and
   d) simultaneously retracting the at least one supporting-body group into a gap created by the at least one deflection between the flexible placing area and a lower side of the products;
   wherein the at least one deflection generated at the ends of the product longitudinal side of the flexible placing area are displaced by moving deflection elements toward one another below the flexible placing area.

2. The method as claimed in claim 1, characterized in that the supporting-body groups, in the cage, are held in a vertical rest position.

3. The method as claimed in claim 1, characterized in that the supporting-body groups in the cage follow the displacement of the deflection in the flexible placing area and are propelled below the products.

4. The method as claimed in claim 1, characterized in that the deflections in the flexible placing area are generated at ends of a product longitudinal side that lie opposite one another.

5. The method as claimed in claim 1, characterized in that the deflections which are generated in the flexible placing area are displaced so as to simultaneously move toward one another.

6. The method as claimed in claim 1, characterized in that the deflections which are displaceable in the flexible placing area are generated by means of mechanically actuatable deflection elements.

7. The method as claimed in claim 1, characterized in that the deflection elements, which impart deflections to the flexible placing area, are electromotively, pneumatically and/or hydraulically driven.

8. The method as claimed in claim 1, characterized in that the deflection elements are displaced along a closed, curved displacement path.

9. The method as claimed in claim 1, characterized in that the closed, curved displacement path comprises a lifting portion having a gate, in which the deflection element is raised, a displacement portion, in which the deflection element is situated in the raised position, a lowering portion, in which the deflection element is lowered, and a return-motion step, in which the deflection element is guided back.

10. A method for the palletizing of products, comprising the following method steps which are repeatedly executable:
   a) providing at least one product layer having one product, or a plurality of products arranged in a placing pattern;
   b) picking up the product layer in a cage, as claimed in claim 1;
   c) conveying the product layer with a robot, which is connected to the cage;
   d) placing the product layer down onto a loading unit;
   e) guiding back the cage with the robot into a position which is above the product layer provided in step a).

11. A device for the handling of products in a product-handling installation which comprises the following components:
   a station which provides at least one product on a flexible placing area;
   a deflection unit which is assigned to the flexible placing area and is configured to impart at least one deflection to the flexible placing area and displace said deflection along the flexible placing area, the deflection unit comprising deflection elements which are displaceably mounted below the placing area in a guide for a closed, curved displacement path;
   a cage for picking up products, wherein the cage is equipped with at least one displaceable supporting-body group which, simultaneously with the displacement of the at least one deflection, can be propelled into a gap created by the at least one deflection between the flexible placing area and a lower side of the products.

12. The device as claimed in claim 11, characterized in that the guide comprises a gate for raising the deflection element, a displacement portion for displacing the deflection element in a raised position, a lowering step for lowering the deflection element and a return-motion step for guiding back the deflection element.

13. The device as claimed in claim 11, characterized in that the deflection elements which impart deflections to the flexible placing area are electromotively, pneumatically and/or hydraulically driven.

14. The device as claimed in claim 11, characterized in that the deflection elements are mechanically actuatable in order to generate displaceable deflections in the flexible placing area.

15. The device as claimed in claim 11, characterized in that the supporting-body groups in the cage and the deflection elements below the placing area are arranged at the ends of the product longitudinal side and mounted so as to be displaceable toward the center of the product layer.

16. The device as claimed in claim 11, characterized in that the supporting-body group comprises a flexible mat made of rods having flexible connection elements.

17. The device as claimed in claim 11, characterized in that the supporting-body groups, in the rest position are vertically arranged and, in the pick-up position, are situated below the product.

18. The use of the device as claimed in claim 11 for the palletizing or transporting of products.

* * * * *